United States Patent Office 3,131,229
Patented Apr. 28, 1964

3,131,229
SEPARATION OF FRIEDEL-CRAFTS CATALYST COMPLEX FROM HYDROCARBONS WITH GLASS WOOL
Talmage D. McMinn, Jr., Texas City, Tex., assignor to Monsanto Chemical Company, St. Louis, Mo., a corporation of Delaware
No Drawing. Filed Aug. 19, 1960, Ser. No. 50,588
1 Claim. (Cl. 260—671)

This invention relates to an improvement in the alkylation of an aromatic hydrocarbon with an olefin. More particularly, it relates to the separation of an organo-metal halide complex from an aromatic hydrocarbon alkylate by means of a polar substance to coalesce the complex.

Friedel-Crafts type metal halide catalysts, particularly aluminum chloride, are extremely effective in the catalysis of various organic reactions and are especially useful in the alkylation of aromatic hydrocarbons by an olefin. It is well understood that in this reaction the active catalytic agent is not the solid metal halide itself but rather is a complex organo-metal halide substance comprising the metal halide and an aromatic compound.

In carrying out a Friedel-Crafts reaction, it has been customary to suspend the solid metal halide in the aromatic compound and then gradually introduce the alkylating agent into the suspension. In such a process, the solid metal halide first slowly reacts to form a partially soluble organo-metal halide complex catalyst of the type described above and this material then promotes the desired reaction.

As practiced commercially in the manufacture of an alkylated aromatic hydrocarbon from which vinyl aromatics can be made, an aromatic hydrocarbon is caused to react with an olefin in the presence of an organo-aluminum chloride catalyst complex. The alkylated product and the catalyst complex separate into two phases in a separation vessel, the complex being recycled to the reactor and the alkylate going to a clean-up system. The alkylate carries with it, as it leaves the separator, entrained fine droplets of the organo-aluminum chloride catalyst complex. This must be removed before the alkylated aromatic hydrocarbon can be converted to the corresponding vinyl aromatic compound in the usual catalytic dehydrogenation reaction because the presence of any chlorides poisons the dehydrogenation catalyst. The undesired contaminants can be removed by washing the alkylate stream with aqueous alkali. Washed alkylate flows to a distillation system where the components are separated, while spent caustic solution containing sodium chloride and aluminate is drained from the wash system and dumped as waste.

The problem which gave rise to this invention is that in such systems approximately 1% of the alkylate is catalyst complex carried over with the alkylate entrained as very small droplets and is lost in the caustic wash system. This loss of catalyst complex as well as a high usage of caustic adds considerably to the operating costs of the alkylation process. Furthermore, if the quantity of aluminum compound in the alkylate is very great, several difficulties arise in the washing step. Thus, besides an excessive consumption of the alkali, there may be formed a gelatinous precipitate which cannot be separated easily from the alkylate. For these and other reasons it is desirable to effect nearly complete removal of the entrained particles from the alkylate before it is washed.

It is, therefore, an object of this invention to recover the organo-metal halide catalyst complex used in the alkylation of an aromatic hydrocarbon with an olefin and entrained with the alkylate product. A further object of the invention is to separate the entrained catalyst complex and alkylate so as to substantially reduce the use of caustic in the alkylate wash system. These and other objects of the invention will become apparent from the following description.

According to the invention aromatic hydrocarbon alkylate containing entrained organo-metal halide catalyst complex of the Friedel-Crafts type reaction is passed through an extended surface polar compound and the coalesced organo-metal halide catalyst complex is recovered therefrom.

The following examples illustrate the invention in, for example, the alkylation of benzene with ethylene, but are not restricted thereto.

*Example I*

An organo-metal halide catalyst complex was prepared by charging 27 grams of flake aluminum and 300 ml. of washed alkylated liquor containing approximately 47% benzene, 42% ethylbenzene and 10% polyethylbenzene to a dissolver consisting of a 500-ml. flask. The mixture was stirred and anhydrous HCl was fed into the solution at such a rate that the reaction mixture would not boil. When the suspension of solids in the solution disappeared, the HCl feed was stopped and the catalyst complex was ready for use. The composition of the complex was as follows:

| | Percent |
|---|---|
| Non-aromatics | 1.4 |
| Benzene | 30.3 |
| Ethylbenzene | 25.4 |
| Diethylbenzene | 5.2 |
| Polyethylbenzene | 11.7 |
| Aluminum chloride | 26 |

The alkylator was a 25-mm. I.D. by 120-cm. glass column and was packed with 5-mm. glass Raschig rings. The column was heated by 3 sections of heating tape individually controlled. A stream consisting of 700 grams per hour of benzene, 151 grams per hour of ethylene, and approximately 7000 grams per hour of the catalyst complex prepared above was fed to the alkylator. The temperature was regulated at 90° C. during the alkylation reaction.

The reaction mixture containing catalyst complex and alkylate was separated in a special T-shaped glass vessel 38-mm. I.D. and 24 cm. long across the T. The unwashed alkylate containing 41% benzene, 46% ethylbenzene, 12% polyethylbenzenes, and approximately 1% catalyst complex was passed through a 2 cm. I.D. glass tube packed with 6 cm. of glass wool and thence into a 4 cm. I.D. flask serving as a separator with a bottom draw-off. The glass wool coalescer was maintained at 35° C.

The aluminum chloride content of the unwashed alkylate separated from the catalyst complex above and the aluminum chloride content of the same alkylate passed through the coalescer are listed below as weight percent of the alkylate:

| Coalescer Temp., ° C. | 35 | 52 | 65 |
|---|---|---|---|
| AlCl₃ in unwashed alkylate | 0.243 | 0.245 | 0.246 |
| AlCl₃ in coalesced alkylate | 0.122 | 0.137 | 0.167 |

*Example II*

In order to establish that catalyst complex recovered by means of the coalescer was active catalytically, 850 grams per hour of benzene, 148 grams per hour of ethylene, and approximately 8000 grams per hour of catalyst complex separated from the unwashed alkylate by the glass wool coalescer in Example I were fed to the alkylator flask described above and reacted to produce ethyl benzene and higher alkylated benzenes. The alkylated product from the reaction was composed of 50% benzene, 42% ethylbenzene, 18% polyethylbenzenes.

It is obvious from the foregoing examples that the new and unique invention of using polar surfaces such as glass wool to separate an entrained organo-metal halide catalyst from an aromatic hydrocarbon alkylate results in a substantial recovery of the suspended catalyst. Furthermore, the reduced content of catalyst complex entrained in the alkylate greatly reduces the necessary clean-up of the alkylate in the caustic wash system and lesser amounts of caustic are thus required.

Other polar compounds besides expanded glass wool can be used in practicing this invention. For instance, compounds such as silicon dioxide, polyethylene, polypropylene, or polytetrafluoroethylene can be employed as a coalescer material. In addition salts of inorganic acids and bases which are unreactive to and insoluble in the aromatic alkylate and catalyst complex, and have a large surface area can be used.

A polar compound is an electrolyte or any compound that can ionize when dissolved or fused. In general, all inorganic acids and bases, and salts thereof belong to this group in which the atoms are supposed to be held in electrostatic union. Glass, for instance, being a highly polar compound attracts the particles of the catalyst complex which is likewise strongly polar, and the greater the surface area the greater the total attraction for the entrained particles. This results in selective wetting of the surface of the glass by the particles and they coalesce and separate from the entraining medium.

The catalyst complex particles which have been collected on the extended surface of a polar compound flow as a film by gravity and drop from the bottom of the surface as large droplets. In a properly designed system, insufficient turbulence exists to redisperse the catalyst complex in the alkylate. Since there is no chemical treatment of the catalyst complex particles, but merely a physical accumulation of them, the recovered catalyst complex is not changed in chemical nature and maintains the same activity as that separated previously from the reaction mixture. Example II shows that no loss in catalyst activity is experienced by the practice of this invention.

The usual temperature at which the alkylated aromatic product is recovered, i.e., from about 20° C. to about 80° C., is suitable for coalescing the catalyst complex particles in this invention. However, the preferred temperature range is from about 30° C. to about 50° C. for the most effective operation of the coalescing material.

While the examples are directed to the alkylation of benzene with ethylene in the presence of an aluminum chloride catalyst, this invention can be employed to separate other metal halide catalysts from a suspension with any alkylated aromatic hydrocarbon. Suitable aromatic compounds in addition to benzene useful in the invention include hydrocarbons such as ethylbenzene, diethylbenzene, toluene, xylene and the like. These compounds may be alkylated with olefins other than ethylene, such as propylene, butylene, isobutylene, and even some higher olefins such as propylene tetramer, for example, by the process herein described.

Considerable latitude may be exercised in the choice of conditions for the alkylation reaction without departing from the scope of the invention. The reaction can be carried out at a temperature in the range of from about 50° C. to about 150° C. Reaction temperatures in the range from about 70 to about 90° C. are preferred when the reaction is conducted under the usual atmospheric pressure. The alkylation reaction may be carried out at pressures ranging from 30 to 300 p.s.i.g. if desired and at these pressures the higher reaction temperatures will prevail.

What is claimed is:

In a process for the alkylation of benzene with ethylene in the presence of Friedel-Crafts organo-aluminum chloride catalyst complex, the improvement which comprises passing the alkylate containing entrained organo-aluminum chloride catalyst complex through an extended surface glass wool at a temperature in the range from about 10° C. to about 80° C. and recovering the coalesced organo-aluminum chloride catalyst complex therefrom for reuse.

References Cited in the file of this patent

UNITED STATES PATENTS

| | | |
|---|---|---|
| 2,378,733 | Sensel | June 19, 1945 |
| 2,760,850 | Lambert et al. | Aug. 28, 1956 |
| 2,786,086 | Gitterman | Mar. 19, 1957 |
| 2,952,720 | Peterson | Sept. 13, 1960 |